(12) United States Patent
Mason et al.

(10) Patent No.: US 10,087,309 B2
(45) Date of Patent: Oct. 2, 2018

(54) PRINTED ARTICLE AND A FEEDSTOCK

(71) Applicants: NGF EUROPE LIMITED, St. Helens (GB); PILKINGTON GROUP LIMITED, Lathom (GB)

(72) Inventors: David Mason, Burscough (GB); James Underwood Campbell, Southport (GB)

(73) Assignees: NGF Europe Limited, St. Helens (GB); Pilkington Group Limited, Lathom (GB)

( * ) Notice: Subject to any disclaimer, the term of this patent is extended or adjusted under 35 U.S.C. 154(b) by 0 days.

(21) Appl. No.: 15/528,803

(22) PCT Filed: Nov. 24, 2015

(86) PCT No.: PCT/GB2015/053583
§ 371 (c)(1),
(2) Date: May 23, 2017

(87) PCT Pub. No.: WO2016/083797
PCT Pub. Date: Jun. 2, 2016

(65) Prior Publication Data
US 2017/0321037 A1 Nov. 9, 2017

(30) Foreign Application Priority Data

Nov. 24, 2014 (GB) .................................. 1420870.6

(51) Int. Cl.
*C08K 7/20* (2006.01)
*C08K 3/40* (2006.01)
(Continued)

(52) U.S. Cl.
CPC ............... *C08K 7/20* (2013.01); *B33Y 70/00* (2014.12); *C08K 3/40* (2013.01); *B29C 64/118* (2017.08);
(Continued)

(58) Field of Classification Search
CPC .. C08K 7/20; C08K 3/40; B33Y 70/00; Y10T 428/2982; Y10T 428/31507;
(Continued)

(56) References Cited

U.S. PATENT DOCUMENTS

| 4,564,491 A | 1/1986 | Koestecki |
| 5,002,827 A | 3/1991 | Shimada et al. |

(Continued)

FOREIGN PATENT DOCUMENTS

| EP | 0931273 B1 | 11/2002 |
| EP | 2017300 A1 | 1/2009 |
| EP | 1628823 B1 | 10/2011 |

OTHER PUBLICATIONS

European Patent Office, International Search Report with Written Opinion issued in PCT/GB2015/5053583, dated Feb. 2, 2016, 10 pages, European Patent Office, Rijswijk, Netherlands.

(Continued)

*Primary Examiner* — Betelhem Shewareged
(74) *Attorney, Agent, or Firm* — Marshall & Melhorn, LLC (57) ABSTRACT

The invention relates to a printed article and a feedstock for printing comprising a matrix forming material, in particular a polymeric material, and a filler material dispersed within the matrix forming material, in which the filler material comprises glass flakes. Glass flakes are characterized as having an aspect ratio of average diameter divided by average thickness greater than or equal to three. Selecting aspect ratio of glass flakes controls an orientation of glass flakes angled relative to a printed layer and formation of a depletion layer in a printed article. Technical effects of angled flakes include better adhesion between successive printed layers in 3D printing and a crack-stopping function. In a preferred embodiment the glass flakes comprise a conductive coating such that a printed article functions as a moisture sensor. Technical effects of a depletion layer include high moisture permeability and so a fast rate of change in electrical resistance due to moisture. A process of (Continued)

manufacturing a feedstock and a process of printing comprising a step of providing glass flakes are also disclosed.

20 Claims, 3 Drawing Sheets

(51) Int. Cl.
*B33Y 70/00* (2015.01)
*B29C 64/118* (2017.01)
*B29K 509/08* (2006.01)
*B29K 505/14* (2006.01)

(52) U.S. Cl.
CPC ...... *B29K 2505/14* (2013.01); *B29K 2509/08* (2013.01); *B29K 2995/0005* (2013.01); *C08K 2201/005* (2013.01); *Y10T 428/2982* (2015.01); *Y10T 428/31507* (2015.04); *Y10T 428/31725* (2015.04); *Y10T 428/31786* (2015.04); *Y10T 428/31855* (2015.04)

(58) Field of Classification Search
CPC ..... Y10T 428/31725; Y10T 428/31786; Y10T 428/31855
See application file for complete search history.

(56) References Cited

U.S. PATENT DOCUMENTS

| | | |
|---|---|---|
| 5,087,518 A | 2/1992 | Shimada et al. |
| 6,067,480 A | 5/2000 | Stuffle et al. |
| 6,070,107 A | 5/2000 | Lombardi et al. |
| 6,228,923 B1 | 5/2001 | Lombardi et al. |
| 6,437,034 B2 | 8/2002 | Lombardi et al. |
| 6,547,982 B1 | 4/2003 | Shepherd et al. |
| 7,049,363 B2 | 5/2006 | Shen |
| 7,338,615 B2 | 3/2008 | Shepherd et al. |
| 7,569,273 B2 | 8/2009 | Bredt et al. |
| 7,754,807 B2 | 7/2010 | Priedeman, Jr. et al. |
| 8,227,540 B2 | 7/2012 | Priedeman et al. |
| 8,322,829 B2 | 12/2012 | Sakuma et al. |
| 8,946,340 B2 | 2/2015 | Yagyu et al. |
| 2004/0038009 A1 | 2/2004 | Leyden et al. |
| 2005/0003189 A1 | 1/2005 | Bredt et al. |
| 2005/0158526 A1* | 7/2005 | Ino ............................ C09D 5/22 428/207 |
| 2007/0241482 A1 | 10/2007 | Giller et al. |
| 2009/0088515 A1* | 4/2009 | Yagyu .................. C03B 37/005 524/494 |
| 2009/0311209 A1 | 12/2009 | Bujard |

OTHER PUBLICATIONS

J. Suwanprateeb et al, Mechanical and in vitro performance of apatite-wollastonite glass ceramic reinforced hydroxyapatite composite fabricated by 3D-printing, J. Mater Sci: Mater Med (2009) 20, pp. 1281-1289.

Hideki Kakisawa et al, Fabrication of nature-inspired bulk laminar composites by a powder processing, Composites Science and Technology, Jan. 1, 2010, vol. 70, No. 1, pp. 161-166, XP026784303, Elsevier, UK.

* cited by examiner

Invention
Fig. 4a

PRINTED ARTICLE AND A FEEDSTOCK

BACKGROUND OF THE INVENTION

The invention relates to a printed article and a feedstock, i.e. a raw material for printing, in which glass is a filler material. Particularly, the invention is concerned with printed articles comprising a polymeric material. The invention also relates to a process of manufacturing the feedstock and a process of printing using the feedstock.

In known shaping processes, such as two-dimensional printing and three-dimensional printing (3D printing), a feedstock composition comprises a matrix forming material such as a polymeric material, i.e. synthetic resin, and a filler material. Feedstock types include a liquid, activated by UV light; a powder, activated by a liquid activation agent; and a filament, melted and deposited in a desired shape, which then solidifies. Additive depositing of a resin composition allows rapid manufacturing of 3D objects. Solid state devices may be printed in 2D or 3D, optionally with more than one feedstock.

EP0931273B1 (Qinetiq/Shepherd) discloses a shaping process for articles characterised by dimensional and dielectric properties suitable for a waveguide. Stereolithography apparatus (SLA) is used to shape liquid resin, curable by exposure to ultraviolet laser light. The laser light causes highly accurate localised polymerisation of a batch monomer. A resulting object is an epoxy resin lattice, having low permittivity (relative dielectric constant of 3). A high permittivity material (relative dielectric constant 12.5) is cast in voids of the lattice. Thus a dielectric medium is formed, having two materials with discrete interfaces between them. Such a medium is capable of functioning as a block of photonic crystal, i.e. a material which is reflective to incident radiation within a predetermined band gap, at all angles, with no internal loss, in a microwave frequency range 2 GHz to 30 GHz.

EP1628823B1 (Z Corporation/Bredt) discloses a shaping process to build three-dimensional articles from successive thin layers. Each layer is formed from a powder mixture of a polymeric particulate material and an adhesive particulate material. Each layer is bonded to a previously formed layer at the same time as the particles of each layer are bonded together. Bonding is by use of a binder fluid, delivered by an ink-jet printing head. Optionally the powder mixture may comprise a filler material for improved mechanical structure. An example of a filler material is soda-lime glass having particle grain diameter between 5 um and 100 um.

Suwanprateeb in J Mater Sci: Mater Med (2009) 20:1281-1289 discloses printed articles for bone replacement using a 3D printer Z400 available from Z Corporation, Burlington Mass., USA. A powder mixture comprising apatite-wollastonite (A-W) glass powder is used to print a green specimen, which is then sintered in an electrical furnace. The mean particle size of the A-W glass powder is approximately 88 um.

U.S. Pat. No. 7,049,363B2 (Daimler/Shen) discloses a feedstock for use in 3D printing. The feedstock comprises a filler material, such as a ceramic, mixed with a polymeric binder material in a solvent. Fine spherical particles of filler and binder are preferred. Articles printed with this feedstock are said to have high shape stability and strength.

US2011012960A1 (Corning/Beall) discloses a process to make a porous article by 3D printing. In a first step, a batch composition, comprising a structural powder and a binder powder, is deposited to form a powder mixture layer. In a second step, an aqueous liquid contacts the layer to selectively activate the binder powder. Depositing and contacting steps are repeated until the required shape is formed. The structural powder may be comprised of glass, having an average particle size of less than 15 um.

U.S. Pat. No. 6,437,034B2 (Stratasys/Lombardi) and U.S. Pat. No. 8,227,540B2 (Stratasys/Priedeman) each discloses a resin composition for making a printed article by 3D printing, comprising a polymer blended with filler material such as glass spheres or glass fibre. Polymers include acrylonitrile-butadiene-styrene, i.e. ABS. The composition is extruded to form a cylindrical rod feedstock or a filament feedstock for a 3D printer. Examples of a suitable printing apparatus include Stratasys Fused Deposition Modelling (FDM) 3D printers.

EP2017300B1 (Nippon Sheet Glass/Yagyu) discloses a thermoplastic resin composition for moulded product, comprising a glass flake filler. The moulded product is said to have high strength and good dimensional stability. When the resin composition is extruded, glass flake filler is said to be oriented along the flowing direction of the resin composition. Glass flakes in the resin composition are thinner than conventional glass flakes, i.e. thickness is in a range from 0.05 um to 1.0 um. Average thickness is in a range from 0.1 um to 0.4 um. Average diameters of the glass flakes are in a range from 20 to 150 um. Optionally, glass flakes are granulated using a binder so that average granular particle size is 200 um. The resin composition is moulded by pouring into a metallic mould or is extruded to form pellets, and the pellets are moulded into a product using an injection moulding machine.

It is an object of the present invention to provide an alternative printed article and a feedstock, and corresponding processes of manufacturing the feedstock and of printing using the feedstock, in which glass is a filler material.

STATEMENT OF INVENTION

The present invention, according to a first aspect, provides a printed article comprising the features set out in claim 1 attached hereto.

The inventors have found new technical effects due to direction-dependent properties, i.e. anisotropy, of glass flake. These effects are not achieved by glass spheres, glass powder or glass fibre. The present invention offers a printed article having advantageous material properties, including shape stability, high moisture permeation resistance and moisture-dependent electrical resistance. These properties are believed to be due to unexpected glass flake orientations achieved during a corresponding printing process and to formation of a depletion layer, having a lower concentration of glass flakes than in the rest of the printed article.

Glass flakes are herein defined as particles of glass, which are substantially planar and have substantially perpendicular sides and defined edges between a planar surface and a side surface. Glass flakes are thus clearly distinguished from glass powder, glass spheres and glass fibre. More precisely, glass flakes have an aspect ratio, defined as average diameter divided by average thickness, greater than or equal to 3. Glass flake average thickness in a range from 0.1 um to 8 um and average diameter in a range from 10 um to 600 um, wherein aspect ratio is greater than or equal to 3, is sufficient to achieve the technical effects. The inventors disclose optimal selection of glass flake dimensions to control glass flake orientation and formation of the depletion layer.

Methods of measurement of average diameter and average thickness are well known in the art, as disclosed in EP2017300B1, hereby incorporated by reference.

Orientation of glass flakes angled relative to a printed layer is surprising because prior art EP2017300B1 teaches that when a resin composition is extruded, a glass flake filler is oriented approximately along the flowing direction of the resin composition.

Whereas EP2017300B1 teaches that thin glass flakes (average thickness at least 0.1 um but less than 0.5 um) are preferred for reinforcing a polymeric material and reducing shrinkage in a moulded product, the inventors have found that selecting the aspect ratio of glass flakes controls the orientation of glass flakes angled relative to a printed layer and formation of a depletion layer in a region of a printed article. Thin glass flakes may be optimally selected for forming a printed article, based on technical effects not known in moulded articles.

Preferably, the matrix forming material is any polymeric material suitable for printing. An example of a 3D printing apparatus is Fused Deposition Modelling apparatus (FDM is a registered trade mark of Stratasys Inc). In the prior art, glass flakes were not added to polymers used for printing with this apparatus.

The inventors have found that in 3D printing, orientation of glass flakes at an angle to a printed layer is advantageous. Angled glass flakes exposed at a surface of a first printed layer provide a rough surface, so that a second printed layer applied on top of the first printed layer has better adhesion to the first printed layer.

The invention overcomes a technical prejudice that angled flakes provide a pathway for mobile species to diffuse down an interface between a glass flake and a matrix forming material. Such an interface is a chemically active surface, which promotes wicking, i.e. transport, of water or other mobile species into the matrix forming material, which can cause warping and corrosion. Surprisingly, the inventors have found that angled flakes in 3D printing according to the invention do not cause wicking, warpage and corrosion.

According to the invention, a crack propagating though a polymer matrix of a printed article will be stopped when the crack reaches a glass flake. The effect is based on an understanding, not present in the prior art, that glass flakes act as mechanical stitching, which has a crack-stopping function. Similar stitching also occurs between successive layers of the printed article. Crack formation is less likely, due to uniform distribution of forces via the stitching between layers, thus avoiding stress concentration.

Preferably, the matrix forming material is a polymer selected from high density polyethylene (HDPE), polycarbonate (PC), polyphenylene ether (PPE), acrylonitrile butadiene styrene (ABS), polyethylene terephthalate (PET), polybutylene terephthalate (PBT), poly(butylene adipate) (PBA), polypropylene (PP), polyurethane (PU), poly(lactic acid) (PLA), polyamide (PA) and UV-cured resins.

Preferably, the matrix forming material is PBT. An example of PBT is obtainable from Du Pont under the name Crastin®, a registered trade mark of Du Pont.

Preferably, the glass flakes are coated with silane. Silane improves adhesion between a glass flake and a matrix forming material.

Preferably, the glass flakes have average diameter in a range from 10 um to 500 um, more preferably from 15 um to 400 um, most preferably from 20 um to 300 um.

Preferably, the glass flakes have average thickness in a range from 0.1 um to 5 um, more preferably from 0.2 um to 3.5 um, most preferably from 0.4 um to 2 um.

Preferably, the glass flakes have an aspect ratio of average diameter divided by average thickness greater than or equal to 10, more preferably 15, most preferably 20.

Preferably, a proportion of the glass flakes are angled relative to a printed layer. Advantageously, a proportion of glass flakes are positioned across an interface between two adjacent layers, such that the glass flakes are partly embedded in two adjacent printed layers. Preferably, at least 10% of flakes positioned across an interface between two adjacent layers are angled relative to a printed layer at an angle greater than 10 degrees. More preferably, at least 20% of such flakes are angled relative to a printed layer at an angle greater than 20 degrees.

Preferably, a proportion of the glass flakes in the printed article is in a range 5 weight % to 30 weight %, more preferably 10 weight % to 20 weight %.

Preferably, the printed article comprises at least one depletion layer having a lower concentration of glass flakes than in the rest of the printed article. Preferably, the depletion layer is at an exposed surface of the printed article.

Preferably, a proportion of the filler material is glass flakes coated with an electrically conductive coating. An example of a conductive coating is silver. An example of glass flakes having a conductive coating is Microglas® Metashine, available from NGF Europe Limited, St Helens, UK. Microglas® is a registered trade mark of Nippon Sheet Glass Co., Limited, Tokyo, Japan. A printed article made from a feedstock comprising glass flakes coated with an electrically conductive coating is an electrical conductor if the concentration of glass flakes in the printed article is greater than or equal to a predetermined threshold. Preferably the concentration of glass flakes coated with silver is greater than or equal to 12 weight %, more preferably greater than or equal to 20 weight %, most preferably greater than 30 weight %.

Preferably, an electrical resistance of the printed article is moisture-dependent, so as to function as a moisture sensor. More preferably, the matrix forming material comprises a water absorbing polymer. Surprisingly, a printed article comprising glass flakes coated with an electrically conductive coating changes electrical resistance in response to changes in moisture. The moisture-dependent changes in electrical resistance of the printed article are believed to be due to the absorption of moisture by the matrix forming material, which causes the matrix forming material to expand, so glass flakes move further apart, thus increasing path length of an electrical current.

Preferably, a change in electrical resistance of the printed article due to a change in moisture from zero to 100% relative humidity is faster than 10 seconds, more preferably 5 seconds. A fast rate of change in electrical resistance is believed to be due to high moisture permeability through a depletion layer of the printed article. Low moisture permeability through the rest of the printed article results in high permeation resistance of the printed article.

The present invention, according to a second aspect, provides a feedstock for a printing apparatus, comprising the features set out in claim 13 attached hereto.

Preferably, the matrix forming material is a polymer selected from high density polyethylene (HDPE), polycarbonate (PC), polyphenylene ether (PPE), acrylonitrile butadiene styrene (ABS), polyethylene terephthalate (PET), polybutylene terephthalate (PBT), poly(butylene adipate) PBA, polypropylene (PP), polyurethane (PU), poly(lactic acid) (PLA), polyamide (PA) and UV-cured resins.

Preferably, the feedstock is configured as a liquid. Preferably the liquid comprises UV-cured resins. Such resins, when exposed to UV light, form cross-links and change from liquid state to solid state.

Alternatively, the feedstock is configured as a filament. A filament, i.e. a thin rod of matrix forming material having filler material dispersed in it, is suitable for winding on a reel, i.e. a bobbin.

Preferably, the glass flakes in the feedstock are coated with silane. Silane improves adhesion between a glass flake and a matrix forming material.

Preferably, the glass flakes in the feedstock have average diameter in a range from 10 um to 500 um, more preferably from 15 um to 400 um, most preferably from 20 um to 300 um.

Preferably, the glass flakes in the feedstock have average thickness in a range from 0.1 um to 5 um, more preferably from 0.2 um to 3.5 um, most preferably from 0.4 um to 2 um.

Preferably, the glass flakes in the feedstock have an aspect ratio of average diameter divided by average thickness greater than or equal to 10, more preferably 15, most preferably 20.

Preferably, a concentration of glass flakes in the feedstock is in a range from 5 weight % to 30 weight %, more preferably from 10 weight % to 20 weight %.

The invention, according to a third aspect, provides a process of manufacturing a feedstock for a printing apparatus comprising steps set out in claim 19 attached hereto.

Preferably, the glass flakes are provided in granular form, preferably having average granular particle size in a range from 0.1 mm to 2 mm, more preferably from 0.5 mm to 1 mm. Glass flakes in granular form are untreated glass flakes bonded together with a binder to form a granule, which is then surface treated. Granular form is advantageous because it reduces dusting, making glass flakes easier to handle. Granular form is preferred because it protects a silane coating on the glass flakes by preventing flakes in a storage bag from scratching each other during transportation and thereby damaging each other's silane coatings. An effect of silane coatings remaining intact is better adhesion between a matrix forming material and glass flakes. An example of a granular product is Microglas® Fleka, available from NGF Europe Limited, St Helens, UK.

Preferably the feedstock is configured as a filament.

The present invention, according to a fourth aspect, provides a process of printing comprising the steps set out in claim 21 attached hereto.

Preferably a depletion layer having a lower concentration of glass flakes than in the rest of the printed article is formed during printing. The depletion layer is a region near a surface of a printed layer containing a lower weight percent of glass flakes than is found in a region remote from the surface of the printed layer.

BRIEF DESCRIPTION OF THE DRAWINGS

The invention will now be described by means of non-limiting examples with reference to the attached figures.

DETAILED DESCRIPTION OF THE INVENTION

Figure 1A:
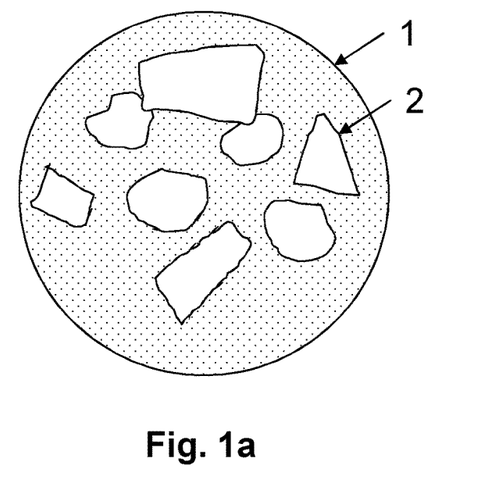
FIG. 1a shows a cross-section of a filament of feedstock comprising glass flakes according to the invention.

FIG. 1a shows a cross-section of a filament of feedstock according to the invention. A matrix forming material 1 has glass flakes dispersed within it as a filler material 2. The glass flakes may overlap each other. For clarity, glass flakes are shown oriented parallel with a diameter of the filament, but glass flakes may also be oriented parallel with a direction of formation of the filament, i.e. perpendicular to the diameter, or oriented randomly. The filament may also comprise a depletion layer adjacent to a surface of the filament.

Figure 1B:
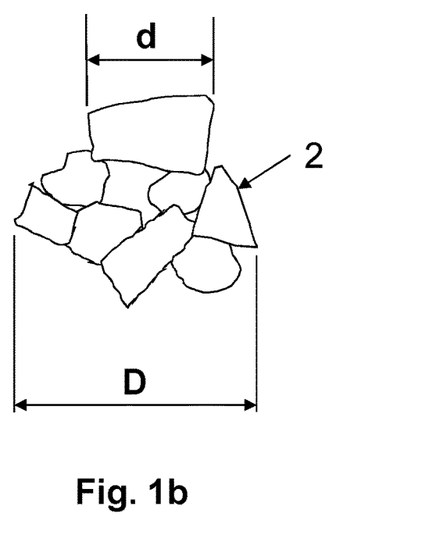
FIG. 1b shows a granule of the glass flakes of FIG. 1a for a process of manufacturing a feedstock according to the invention.

FIG. 1b shows a granule of glass flakes 2, which are bound together with a binder material. Glass flakes 2 in this granule added to a matrix forming material disperse to form the filament cross-section shown in FIG. 1a. A flake diameter "d" is defined as a longest dimension of the glass flake 2. A granular diameter "D" is defined as a longest dimension of the granule of glass flakes 2.

Figure 2A:
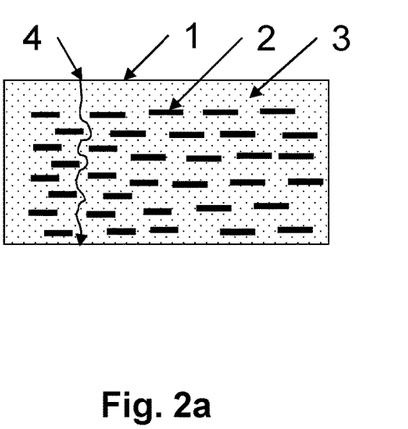
FIG. 2a shows an embodiment of the invention with a depletion layer.

FIG. 2a shows a single layer printed article according to the invention. A depletion layer 3 has a lower concentration of filler material 2 dispersed within the matrix forming material 1 than in the rest of the printed article. Permeation of moisture occurs along a path 4. The path 4 deviates from a straight line between top and bottom surfaces of the matrix forming material 1 due to the presence of impervious filler material 2. In the depletion layer 3, because there are no obstacles, the path 4 is a straight line.

Figure 2B:
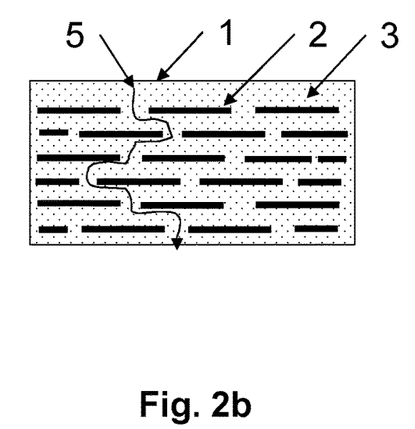
FIG. 2b shows an embodiment of the invention with high permeation resistance.

FIG. 2b shows a single layer printed article according to the invention with high moisture permeation resistance. Permeation of moisture occurs along a path 5, which has a longer path length than FIG. 2a, due to the larger average diameter of the glass flakes. An advantage of the invention is that glass flakes reduce water absorption. The larger the average diameter, the higher the permeation resistance. For a predetermined average thickness of glass flakes, the aspect ratio should be selected to be as high as possible, for maximum moisture permeation resistance. For clarity, FIG. 2a and FIG. 2b omit any flakes angled relative to a printed layer.

Figure 3:
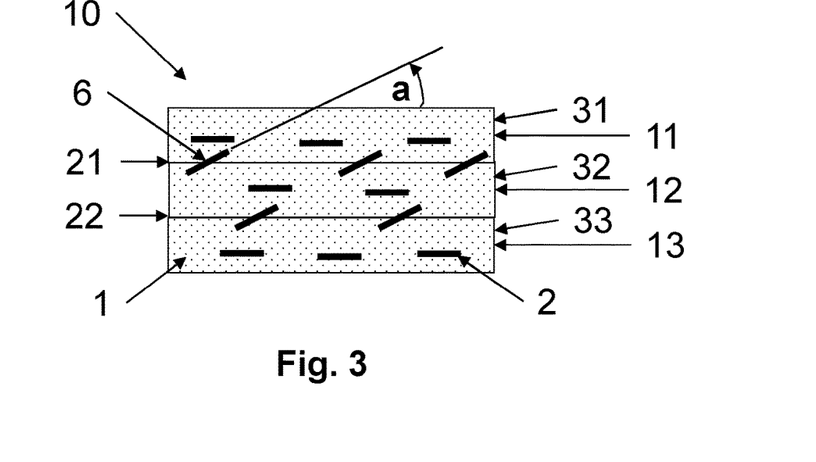
FIG. 3 shows an embodiment of the invention with stitching between layers.

FIG. 3 shows an embodiment of the invention with stitches between layers. A 3D printed article 10, formed by additive depositing of feedstock using a 3D printer, comprises layers 11, 12, 13 and interfaces 21, 22 between them. Each layer comprises a matrix forming material 1 and a filler material 2 within the layer. Depletion layers 31, 32, 33 have a lower concentration of filler material 2 dispersed within the matrix forming material 1 than in the rest of the layers 11, 12 and 13 respectively. Stitches 6 are filler material particles which straddle across interfaces 21, 22 partly embedded in each adjacent layer 11, 12 and 12, 13 respectively. Orientation of glass flakes 2 is measured as an angle "a" relative to a printed surface. For a larger stitching effect, larger average thickness is preferred. Larger average thickness provides stronger stitches 6. For larger crack stopping effect, larger average diameter is preferred. Larger average diameter provides larger stitches 6. For both a larger stitching effect and larger crack stopping effect, larger aspect ratio is preferred. Silane coating on the filler material 2 increases adhesion to the matrix forming material 1, so improves a breaking strength of the stitches 6. A larger concentration of filler material 2 in the matrix forming material 1 provides more stitches 6, so provides improved durability. For clarity, FIG. 3 and FIG. 4a omit any flakes angled relative to a printed layer at the top surface.

Figure 4A:
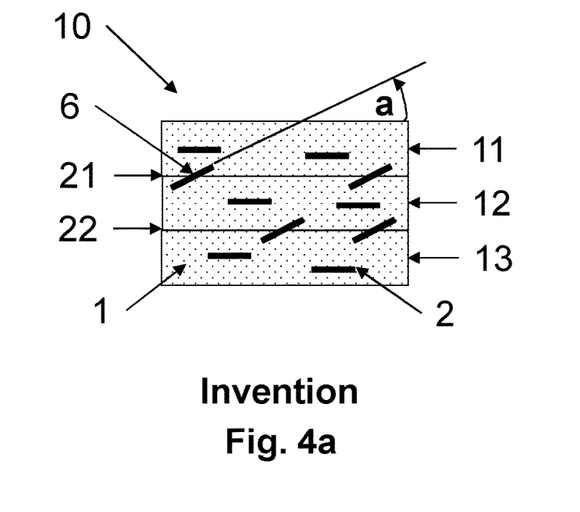
FIG. 4a shows an embodiment of the invention with glass flake oriented at an angle.
Figure 4B:
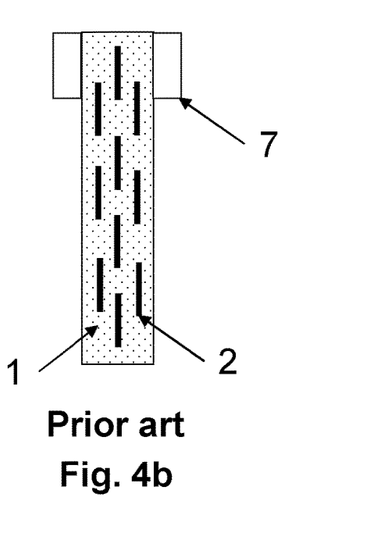
FIG. 4b shows prior art in which glass flake is oriented parallel to a direction of extrusion.

FIG. 4a shows an embodiment of the invention in which orientation of glass flakes 2 is measured as an angle "a" relative to a printed surface and controlled so as to optimise adhesion between printed layers. By contrast, FIG. 4b shows prior art for extrusion, showing a forming material 1 being extruded through an extrusion die 7, causing filler material 2 to be aligned substantially parallel with the direction of formation.

Figure 5:
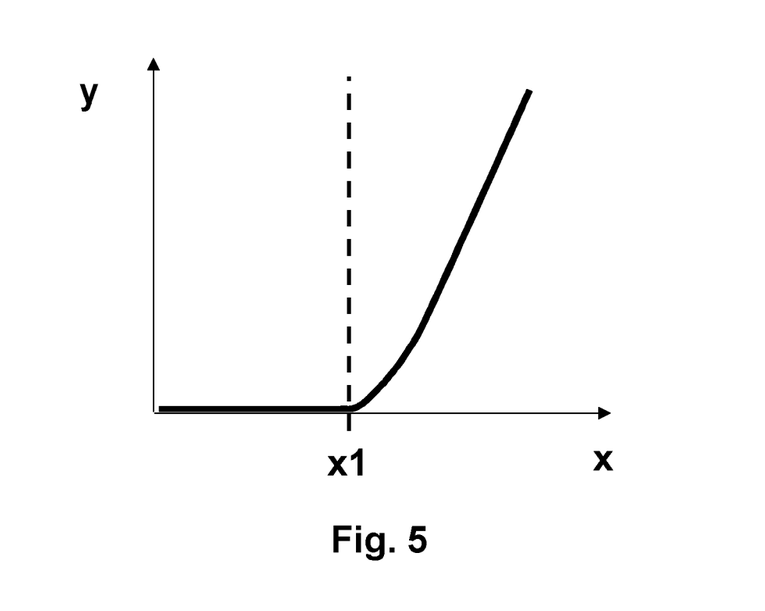
FIG. 5 is a chart of electrical conductivity (y) against weight percent glass flake (x)

FIG. 5 is a chart of electrical conductivity "y" against weight percent filler material "x" in a printed article. The curve shows that electrical conductivity is approximately zero at concentrations of filler material below a threshold value "x1". At this threshold it is believed that adjacent conductive coatings touch providing pathways for electrical current. Above the threshold value "x1" electrical conductivity increases approximately linearly.

Figure 6:
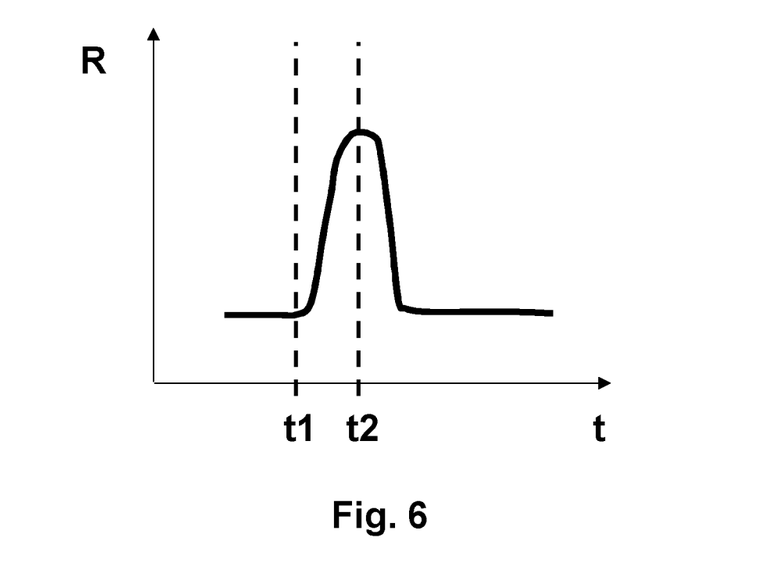
FIG. 6 is a chart of resistance (R) against time (t) showing a change due to moisture.

FIG. 6 is a chart of electrical resistance "R" of a printed article against time "t". At time "t1" moisture in the air around the printed article increases from ambient to maximum and then returns to zero. Resistance of the printed article changes over time at a rate dependent on the permeation resistance of the printed article, until it reaches a maximum at time "t2" and then returns to normal. A sensor response time is (t2−t1).

EXAMPLES OF THE INVENTION

Example 1

A printed article according to the invention comprises glass flakes having average thickness 5 um and average diameter 600 um, i.e. aspect ratio 120. Glass flakes such as Microglas® Glass Flake type REF-600, composition E-Glass, no surface treatment, supplied by NGF Europe Limited, St Helens, UK are suitable. E-Glass composition is selected because it is mechanically stronger than C-Glass, and is suitable for situations without risk of acid corrosion.

Example 2

A printed article according to the invention comprises glass flakes having average thickness 5 um and average diameter 160 um, i.e. aspect ratio 32. Glass flakes such as Microglas® Glass Flake type RCF160, composition C-Glass, no surface treatment, supplied by NGF Europe Limited, St Helens, UK are suitable. C-Glass is selected because it has better resistance to acid corrosion than E-Glass.

Printed articles of Example 1 and Example 2 are formed by additive depositing of layers, to form a 3D object. The printed article of Example 1 is mechanically stronger than Example 2. Higher mechanical strength is believed to be due to improved stitching and crack stopping capability, due to glass flakes of higher aspect ratio.

In a printing process to manufacture both Example 1 and Example 2, a 3D printer known in the art is set to a suitable temperature for a desired matrix forming material. The 3D printer is optimised to achieve the alignment of glass flakes and a depletion layer shown in FIG. 3. In particular, a temperature of printing is reduced so that the matrix forming material is more viscous, thereby forming a thicker deposit, i.e. a blob. A thicker deposit is found to have more angled glass flakes. Routine experimentation is required to select a printer head nozzle diameter and print speed suitable for a selected resin composition.

Example 3

A feedstock for 3D printing according to the invention comprises glass flakes having average thickness 2 um and average diameter 300 um, i.e. aspect ratio 150. Glass flakes such as Microglas® Glass Flake type RCF-2300, composition C-Glass, no surface treatment, supplied by NGF Europe Limited, St Helens, UK are suitable.

Printed articles made with a feedstock of Example 3 have higher moisture permeation resistance than similar printed articles made with a feedstock of Example 2. It is believed that flakes having a larger average diameter provide better moisture permeation resistance because of a longer path length for moisture, as shown in FIG. 2b, in contrast with FIG. 2a.

Example 4

A feedstock for 3D printing according to the invention comprises glass flakes in granular form. Glass flake average thickness is 5 um and average diameter is 600 um, i.e. aspect ratio 120. Glass flakes are bound together with a binder material. Average granular particle size is 1.0 mm, binder type is epoxy and coupling agent is amino silane and/or epoxy silane. Glass composition is E-Glass. Glass flakes such as Microglas® Fleka type REFG-101 supplied by NGF Europe Limited, St Helens, UK, are suitable.

Example 5

A feedstock for 3D printing according to the invention comprises smaller glass flakes in granular form. Glass flake average thickness is 0.7 um and average diameter is 160 um, i.e. aspect ratio 230. Glass flakes are bound together with a binder material. Average granular particle size is 0.7 mm, binder type is epoxy and coupling agent is amino silane. Glass composition is E-Glass. Glass flakes such as Microglas® Fleka type MEG-160-FYM01 supplied by NGF Europe Limited, St Helens, UK, are suitable.

Pellets of PBT under the name Crastin®, obtained from Du Pont, Wilmington, Del., USA, are mixed with the granular glass flakes in a master compounder apparatus, known in the art, and extruded to form a filament. The filament is wound on a reel suitable for use as a feedstock for a 3D printer known in the art.

Example 6

A two dimensional electrically conductive printed article according to the invention comprises glass flakes having average thickness 5 um and average diameter 90 um, i.e. aspect ratio 18. Glass flakes such as Microglas® Metashine type MC-5090PS, composition C-Glass, having a silver coating, supplied by NGF Europe Limited, St Helens, UK are suitable. A matrix forming material capable of absorbing moisture is selected from moisture sensitive polymers known in the art, for example a nylon, i.e. a hygroscopic polyamide (PA).

The printed article, dimensions 0.75 cm by 0.75 cm and thickness 0.3 cm, is printed on a circuit board and connected to a resistance measurement apparatus. Moisture in the air around the printed article is increased momentarily, and the change in electrical resistance is shown in FIG. 4. At time "t1" moisture in the air around the printed article increases from zero to 100% relative humidity and then returns to zero. Electrical resistance of the printed article changed from 0.8 ohm at "t1" to 1.0 ohm at "t2". A sensor according to the invention responds in a time (t2−t1) of ten seconds.

Example 7

A printed article according to the invention comprises glass flakes having average thickness 2 um and average diameter 40 um, i.e. aspect ratio 20. Glass flakes such as Microglas® Glass Flake type RCF-2015, composition C-Glass, surface treatment silane, supplied by NGF Europe Limited, St Helens, UK are suitable.

Example 8

A printed article according to the invention comprises glass flakes having average thickness 0.4 um and average diameter 40 um, i.e. aspect ratio 100. Glass flakes such as Microglas® Glass Flake type RCFD015, composition E-Glass, surface treatment silane, supplied by NGF Europe Limited, St Helens, UK are suitable.

Example 9

A printed article according to the invention comprises glass flakes having average thickness 0.2 um and average diameter 30 um, i.e. aspect ratio 150. Glass flakes such as Microglas® Glass Flake type RCFB-030, composition E-Glass, surface treatment silane, supplied by NGF Europe Limited, St Helens, UK are suitable.

Example 10

A printed article according to the invention comprises glass flakes having average thickness 0.1 um and average diameter 20 um, i.e. aspect ratio 200. Glass flakes such as Microglas® Glass Flake type RCFA-020, composition C-Glass, surface treatment silane, supplied by NGF Europe Limited, St Helens, UK are suitable.

Example 11

A printed article according to the invention comprises glass flakes having average thickness 1 um and average diameter 10 um, i.e. aspect ratio 10. Glass flakes such as Microglas® Glass Flake type RCFA-010, composition C-Glass, surface treatment silane, supplied by NGF Europe Limited, St Helens, UK are suitable.

Example 12

A printed article according to the invention comprises glass flakes having average thickness 5 um and average diameter 15 um, i.e. aspect ratio 20. Glass flakes such as Microglas® Glass Flake type REF-015, composition E-Glass, surface treatment silane, supplied by NGF Europe Limited, St Helens, UK are suitable.

Examples 7 to 11 are provided from an improved process of manufacturing glass flakes whereby average thickness is in a range from 0.1 um to 2 um and average diameter is in a range from 10 um to 40 um. Glass flakes from the improved process are substantially without breaks or holes, i.e. have structural integrity. Combining these glass flakes with the selection of aspect ratio in a range from 10 to 200 provides printed articles with glass flakes angled relative to the printed layer and having a depletion layer.

Example 12 comprises glass flakes having a small average diameter and a large average thickness, such that the aspect ratio is three. Glass flakes with an aspect ratio significantly less than three resemble spheres, whose orientation is difficult to control.

Table 1 lists the Examples described above, showing selection of glass flakes by average diameter in um and average thickness in um so as to control aspect ratio of glass flakes in a printed article and in a feedstock for a printing apparatus.

TABLE 1

| Ex. | Flake | Granular | Treated | Average Diameter/ um | Average Thickness/ um | Aspect Ratio |
|---|---|---|---|---|---|---|
| 1 | REF-600 | No | No | 600 | 5 | 120 |
| 2 | RCF-160 | No | No | 160 | 5 | 32 |
| 3 | RCF-2300 | No | No | 300 | 2 | 150 |
| 4 | REFG-101 | Yes | Yes | 600 | 5 | 120 |
| 5 | MEG-160FY | Yes | Yes | 160 | 0.7 | 230 |
| 6 | MC-5090PS | No | Silver | 90 | 5 | 18 |
| 7 | RCF-2015 | No | Yes | 40 | 2 | 20 |
| 8 | RCFD-015 | No | Yes | 40 | 0.4 | 100 |
| 9 | RCFB-030 | No | Yes | 30 | 0.2 | 150 |
| 10 | RCFA-020 | No | Yes | 20 | 0.1 | 200 |
| 11 | RCFA-010 | No | Yes | 10 | 1 | 10 |
| 12 | REF-015 | No | Yes | 15 | 5 | 3 |

INDUSTRIAL USE

A printed article comprising glass flake dispersed in a polymer has improved properties due to orientation of the glass flakes during printing. In an advantageous embodiment of the invention, glass flakes are provided in granular form to facilitate manufacture of a feedstock.

An advantage of glass flakes over glass spheres is the formation of a depletion layer at a surface of a printed article thus providing a smoother surface and better shape definition, whilst simultaneously providing some glass flakes angled relative to a printed layer to provide a stitching effect between adjacent printed layers. Formation of a depletion layer at a surface is believed to be result of movement of glass flakes towards each other during printing. The inventors have found that this movement can be controlled by selection of glass flake diameter, aspect ratio and concentration in a resin composition.

Such a depletion layer is also advantageous in a two dimensional printed article according to the invention wherein the glass flakes are coated with silver and are at least 12 weight % of the resin composition. In this embodiment, the printed article has moisture dependent electrical resistance so as to be capable of functioning as a moisture sensor. The depletion layer is believed to result in fast response of the moisture sensor to a rise in moisture level. The rest of the printed article has high moisture permeation resistance, so the moisture sensor has a fast response to a fall in moisture level because little moisture is absorbed in the device. Thus a low hysteresis moisture sensor is provided.

The invention claimed is:
1. A printed article, comprising:
a matrix forming material, and
a filler material, dispersed within the matrix forming material, wherein the filler material comprises glass flakes, having an aspect ratio of average diameter divided by average thickness greater than or equal to three, and a proportion of the glass flakes is angled relative to a printed layer.

2. The printed article according to claim 1, wherein the matrix forming material (1) is a polymer selected from high density polyethylene (HDPE), polycarbonate (PC), polyphenylene ether (PPE), acrylonitrile butadiene styrene (ABS), polyethylene terephthalate (PET), polybutylene terephthalate (PBT), poly(butylene adipate) (PBA), polypropylene (PP), polyurethane (PU), poly(lactic acid) (PLA), polyamide (PA) and UV-cured resins.

3. The printed article according to claim 2, wherein the glass flakes are coated with silane.

4. The printed article according to claim 1, wherein the glass flakes have average diameter in a range from 10 um to 500 um.

5. The printed article according to claim 1, wherein the glass flakes have average thickness in a range from 0.1 um to 5 um.

6. The printed article according to claim 1, wherein the glass flakes have an aspect ratio of average diameter divided by average thickness greater than or equal to 10.

7. The printed article according to claim 1, wherein a proportion of the glass flakes in the printed article is in a range 5 weight % to 30 weight %.

8. The printed article according to claim 1, comprising a depletion layer having a lower concentration of glass flakes than in the rest of the printed article.

9. The printed article according to claim 1, wherein a proportion of the filler material is glass flakes coated with an electrically conductive coating.

10. The printed article according to claim 9, wherein electrical resistance of the printed article is moisture-dependent, so as to function as a moisture sensor.

11. The printed article according to claim 10, wherein a change in electrical resistance of the printed article due to a change in moisture is faster than 10 seconds.

12. A feedstock for a printing apparatus, comprising:
a matrix forming material, and
a filler material, dispersed within the matrix forming material to provide a mixture,
wherein the filler material comprises glass flakes, having an aspect ratio of average diameter divided by average thickness greater than or equal to three;
wherein the feedstock is configured as a filament, and glass flakes are mainly oriented parallel with a diameter of the filament.

13. The feedstock according to claim 12, wherein the matrix forming material is a polymer selected from high density polyethylene (HDPE), polycarbonate (PC), polyphenylene ether (PPE), acrylonitrile butadiene styrene (ABS), polyethylene terephthalate (PET), polybutylene terephthalate (PBT), poly(butylene adipate) (PBA), polypropylene (PP), polyurethane (PU), poly(lactic acid) (PLA), polyamide (PA) and UV-cured resins.

14. The feedstock according to 12, wherein the glass flakes have average thickness in a range from 0.1 um to 5 um.

15. The feedstock according to claim 12, wherein the glass flakes have an aspect ratio of average diameter divided by average thickness greater than or equal to 10.

16. The feedstock according to claim 12, wherein a concentration of glass flakes in the feedstock is in a range from 5 weight % to 30 weight %.

17. A process of manufacturing a feedstock for a printing apparatus, comprising:
providing a matrix forming material,
providing a filler material, and
dispersing the filler material within the matrix forming material to provide a mixture, wherein the filler material comprises glass flakes, having an aspect ratio of average diameter divided by average thickness greater than or equal to three; and
wherein the feedstock is configured as a filament, and glass flakes are mainly oriented parallel with a diameter of the filament.

18. The process of manufacturing a feedstock according to claim 17, wherein the glass flakes are provided in granular form.

19. A process of printing, comprising:
providing a feedstock, comprising:
a matrix forming material, and
a filler material, dispersed within the matrix forming material, and feeding the feedstock into a printing apparatus,
wherein the filler material comprises glass flakes, having an aspect ratio of average diameter divided by average thickness greater than or equal to three, and
wherein a proportion of the glass flakes is angled relative to a printed layer.

20. The process of printing according to claim 19, wherein a depletion layer having a lower concentration of glass flakes than in the rest of the printed article is formed during printing.

* * * * *